United States Patent

Drewling

[11] Patent Number: 6,064,472
[45] Date of Patent: May 16, 2000

[54] METHOD FOR SPEED MEASUREMENT ACCORDING TO THE LASER-DOPPLER-PRINCIPLE

[75] Inventor: Peter Drewling, Otter, Germany

[73] Assignee: LAP GmbH Laser Applikationen, Lüneburg, Germany

[21] Appl. No.: 08/949,872

[22] Filed: Oct. 14, 1997

[30] Foreign Application Priority Data

Oct. 22, 1996 [DE] Germany .............................. 196 43 475

[51] Int. Cl.⁷ .................................. G01P 3/36; H01S 3/04

[52] U.S. Cl. ............................. 356/28.5; 356/28; 372/34; 372/33

[58] Field of Search ...................... 356/28, 28.5; 372/34, 372/33

[56] References Cited

U.S. PATENT DOCUMENTS

| | | | |
|---|---|---|---|
| 3,895,872 | 7/1975 | Dandliker et al. | 356/28 |
| 4,284,351 | 8/1981 | Alldritt et al. | 356/28.5 |
| 5,011,278 | 4/1991 | Farrell | 356/28 |
| 5,359,404 | 10/1994 | Dunne | 356/28 |
| 5,469,250 | 11/1995 | Holmes | 356/28 |
| 5,610,703 | 3/1997 | Raffel et al. | 356/28 |

*Primary Examiner*—Stephen C. Buczinski
*Attorney, Agent, or Firm*—Vidas, Arrett & Steinkraus, P.A.

[57] ABSTRACT

A method for speed measurement according to the laser-Doppler-principle with which with the help of a beam splitter the light beam of a laser is converted into two part beams crossing on or in the measured object and with the help of an optical receiver the spectral maximum of the intensity modulation of the reflected light is measured. A Köster prism is used as a beam splitter such that the part beams formed intersect at the desired angle on or in the measured object.

11 Claims, 2 Drawing Sheets

METHOD FOR SPEED MEASUREMENT ACCORDING TO THE LASER-DOPPLER-PRINCIPLE

BACKGROUND OF THE INVENTION

The invention relates to the method and apparatus for speed measurement according to the laser-Doppler-principle.

With speed measurement (special-filter-principle), a screen is projected from equidistant lines of light onto the measured object or into the measuring medium. With the movement of the surface of the measuring object or medium perpendicular to the grid lines, the reflected light experiences an intensity modulation which comprises a spectral maximum which is directly proportional to the movement speed.

Since the projected light pattern with its grid constants represents the material measure, the measuring accuracy of the whole system is directly dependent on the accuracy of the screen. With laser-Doppler speed measurement, this screen is produced within the measuring volume by the superimposition of two coherent part beams which arise, by way of beam splitting, from a laser beam or are produced by two synchronised lasers.

The screen constant determining the accuracy is dependent on two essential parameters, that is the superposition angle of both part beams the wavelength of the laser light.

For the beam splitting which is chiefly applied, there are various known solutions. One lies in directing by way of laser light through a semipermeable planar mirror at 45° to the beam path, a first part beam onto the measured object and via a second planar mirror directing the transmitted part beam likewise on the measured object. With the application of a so-called beam splitting cube with which the splitter surface is arranged at an angle of 45° to the beam path, a part beam is directed onto the measured object via a planar mirror. By way of turning the mentioned beam splitting cube about 45° with respect to the beam path, there is also the possibility of producing two part beams without an additional mirror in that the splitter surface is arranged at an oblique angle to the beam path. Finally it is also known to produce beam splitting with an optical grid or with holographic-optical elements.

Both the first mentioned systems have several disadvantages. The use of several components is disadvantageous with regard to the vibrational stability. Furthermore one must take account of the high cost of angular adjustment for the separated reflecting surfaces. The part beams have differing optical wavelengths which particularly with lasers of a small coherence length, for example with diode lasers, can lead to a detraction of the superposition contrast.

With the use of a beam splitting cube with the latter mentioned version, it is difficult to achieve an optimal beam splitter ratio. Slight errors in the planicity of the beam splitter surface have a considerable effect. Since the angle of impingrnent is relatively small, with an unclearly defined index transition, this has a negative effect on the cementing surface of the beam splitting cube. The polarisation dependency of the reflection/transmission ratio of the splitter surface, with obligue impinging angles, cannot be neglected.

The latter mentioned variation, that is the use of grids or holographic elements requires a relatively high expense. Moreover there are problems with dampness as well as the danger of ageing with holograms on reproduction base material. The optical efficiency is relatively small.

SUMMARY OF THE INVENTION

It is therefore the object of the invention to provide a method for speed measurement according to the laser-Doppler-principle which has a simple construction, can be produced without great expense, even in small batches and uses conventional components.

According to the invention a so-called Köster prism is used as a beam splitter so that the part beams formed intersect at the desired angle on or in the object.

The Köster prism is known per se and consists of a triangular prismatic beam splitting element. The splitting surface extends from one edge of the prism perpendicularly to the oppositely lying surface. A Köster prism is usually applied in interferometry for producing two parallel beams. Due to the fact that the impinging angle of the laser beam onto a lateral surface of the Köster prism is altered, there arises two part beams, reflected from the lateral surfaces, which cross on the measuring object in the known manner.

The use of a Köster prism brings considerable advantages. The optical arrangement is distinguished by a high vibrational stability. There is no drift of the superposition angle with the temperature and there is also no mechanical long-time drift. An angular adjustment of two reflecting separating surfaces to one another is not required. Furthermore the same optical path lengths of both part beams is maintained which leads to an improvement of the superposition contrast, particularly when using diode lasers. The beam splitting ratio of 50:50 may be easily achieved. Errors in planicity of the splitter surface have a relatively slight effect due to the relatively large impinging angle. The same applies to the distortion-dependent, unclearly defined index transition on the cemented surface of the prism. The polarisation dependency of the relection/transmission ratio of the splitter layer is relatively small.

A Köster prism is a conventional optical component which may be easily obtained, is inexpensive and may be manufactured in small and large batches. Due to the good optical efficiency, a small laser power is sufficient for the measuring operation. The superposition angle may be set in a simple manner by turning the prism. By way of this there results a larger degree of freedom for setting the speed scaling of the measuring instrument.

Demands of accuracy of the laser-Doppler speed measurement in the region of thousandths require a beam source which is esssentially wavelength stable. For this there offers itself a gas laser with its own stabilty but which is relatively complicated. It is also known to use diode lasers which are externally wavelength stabilised. It is known to achieve the stabilisation of the laser temperature with the help of a thermostat.

It is a further object of the invention to achieve a temperature independency of the lasers which are not stabilised in the wavelength.

The change in wavelength with temperature of for example one laser diode is about:

$$\frac{d\lambda}{dT} = 0.2\,\text{nm}/\,°C.$$

Subsequently the relative change is:

$$\frac{d\lambda}{dT} \Big/ \lambda o = 0.033\%/°C. = k_\lambda$$

Without correction the following measuring error occurs:

$$\tilde{v} = v \cdot \frac{1}{1 + k_\lambda \cdot (T - To)}$$

wherein v is the actual speed

ṽ is the displayed speed $k_\lambda$ is the relative change of $\lambda$

To is the reference temperature.

Accordingly there results the following formula for the actual speed:

$$v = \tilde{v} \cdot (1 + k_\lambda \cdot (T - To))$$

This dependency of the wavelength on temperature is applied in the correction of the measured speed values in that the reading is corrected corresponding to the stored correction table, and is displayed corrected. For carrying out the method it is merely necessary to measure the temperature of the laser. A processor for converting the readings into the speed values is present in any case.

With speed measurement according to the laser-Doppler-principle, without further ado it may be ascertained in which of the two possible directions the object or the medium moves. It is known to carry out direction determination with a so-called frequency offset. With this one of the two superimposed part beams is shifted in frequency with respect to the other about a permanent amount, by which means it results that the measuring frequency is also shifted about the same amount. As a result, movements in the one direction then have a higher frequency and movements in the other direction have a lower frequency and can be therefore unambiguously acquired. The technical effort in frequency shifting a laser beam, for example by way of acousto-optical effects or by way of moving grids, is however quite considerable.

For this reason it is a further object of the invention, with the speed measurement according to the laser-Doppler-principle, to also carry out a direction determination in a simple manner. This is effected according to the invention in the form that with the help of a detector determining a position, the direction of movement of the granular contrast structure of the reflected light is measured Suitable detectors are known per se. For example a CCD line may be used here or a PSD (position sensitive detector) or likewise.

If a diffuse surface is irradiated with the coherent laser beam the reflected light is not homogenous distributed (at the stochastic rough surface contour), rather has a three-dimensional intereference structure with stochastically intensity minima and maxima. If the surface is moved the three dimensional intensity structure is moved correspondingly.

In that a plane of this structure is copied by a position sensitive detector (PSD, CCD-array or diode line) temporarily spaced images can be made and stored. The evaluation of the direction of the movement results from the correlation of the individual image recordings.

This principle is similar to the method to measure the velocity after the correlation principle. However, the invention uses for the speed measurement the difference-Doppler-method and uses the Speckle-correlation only to enlarge the measurement possibility to determine the direction reversal if the speed is zero. Therefore, in the invention the main disadvantage of a direct speed measurement through the Speckle-correlation is avoided which generates a dependency of the measurement value upon the focus position of the imaging optic (dependency of the distance).

BRIEF DESCRIPTION OF THE DRAWING

The invention is hereinafter described in more detail by way of embodiment examples.

DETAILED DESCRIPTION OF THE INVENTION

Figure 1:
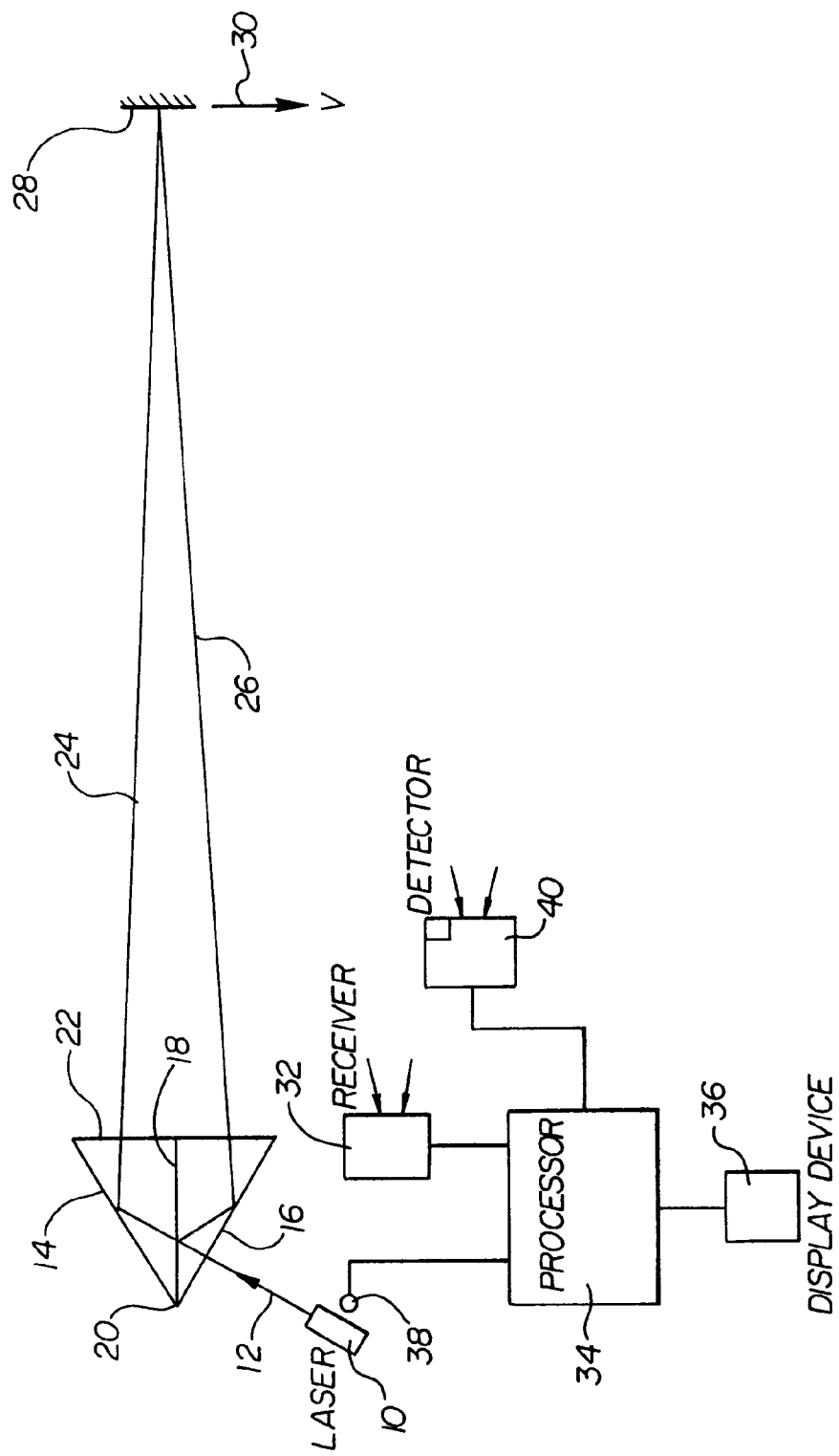
FIG. 1 schematically shows a device for carrying out the method according to the invention.

A diode laser 10 directs a coherent beam 12 onto the surface of a Köster prism 14. The beam path of the beam 12—in the case shown—is roughly perpendicular to the facing surface 16 of the prism 14 which comprises a splitter surface 18 which extends from the one edge 20 to the opposite prism surface 22 which runs perpendicularly to the splitter surface 18. By way of this two part beams 24, 26 are produced which after passing through two identically long path distances intersect at the surface of the object 28 which moves in the direction of the arrow 30 with a speed v. The speed v is to be measured. The surface 22 of the prism 14 consequently extends parallel to the direction of movement 30 of the object 28, or in other words, the splitter surface 18 is perpendicular to this direction of movement. By changing the rotational position of the prism 14 it is however possible to change the crossing angle of the part beams 24, 26.

A photosensitive receiver 32 receives the reflected light and produces a corresponding exit signal for a processor 34 which evaluates the spectral maximum and from this computes a speed reading which is indicated on a display device 36. It is clear that also other registrations if readings are possible.

In the processor 34 there is further stored a table or an equation which gives the dependency of the wavelength of the light emitted by the laser on the temperature of the laser 10. This dependency in the usual temperature range of e.g. 10 to 40° C. is essentially linear. The measured speed value is thus corrected by the temperature dependent wavelength values. In the Figure there can be recognised a temperature probe 38 which measures the temperature of the laser 10 and whose measuring signal is likewise inputted into the processor 34. In this manner the processor may evaluate or display the actual speed in the manner described.

A detector 40, e.g. a CCD line or a PSD evaluates the direction of displacement of the contrast structure on the surface of the object 28 and thus its direction of movement. The detector is connected to the processor 34. The method works according to the Speckle-correlation as described above.

Figure 2:
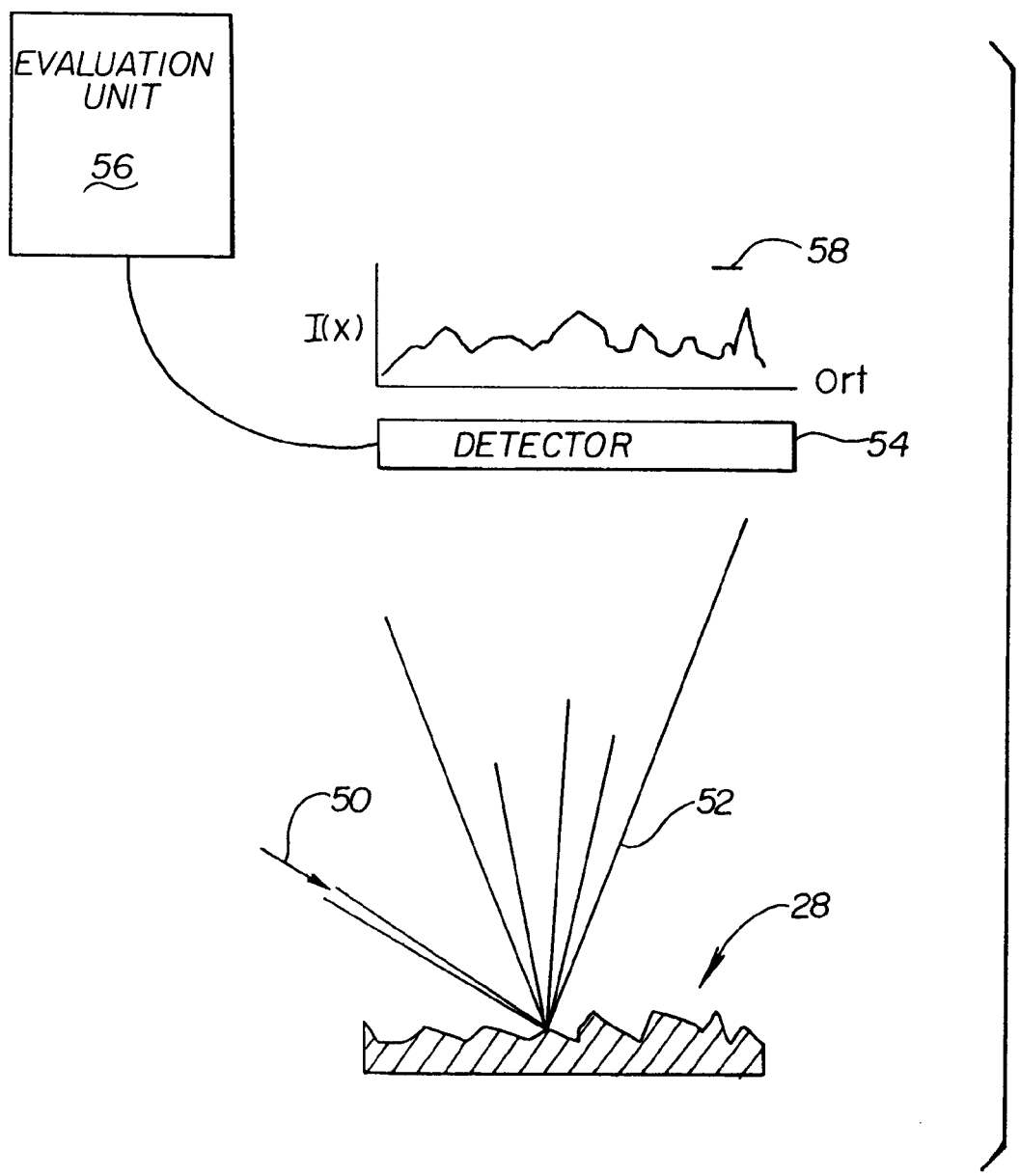
FIG. 2 schematically shows an arrangement for determining the direction of motion.

As to be seen in FIG. 2, the object 28 is irradiated by laser light according to arrow 50, generally according to the illustration of FIG. 1 and the associated description above. The lines 52 represent the reflecting beams, the direction and distribution of which is known to be dependent on the surface structure of the object 28. The reflecting laser light is given onto a position sensitive detector 54, the exit signal of which is evaluated by an evaluation unit 56. In the diagram shown above the position sensitive detector, the intensity of the arriving light is displayed in correlation to the locus. The direction of motion is indicated by arrow 58.

As stated further above, the reflecting light is not distributed homogenously, but has a three-dimensional inference structure having stochastically distributed minimum and maximum values of intensity in random distribution. As the surface is moved, e.g. in direction of arrow 58, the three-dimensional intensity structure is moving to the same amount. By means of the detector 54, sample shots may be taken at points of time and kept in the evaluation unit. The direction of motion follows from correlating the single shots.

I claim:

1. A method for measuring the speed of a moving object according to the laser-Doppler-principle, comprising the steps of:

generating a coherent light beam;

splitting the coherent light beam with a Köster prism beam splitter which splits the light beam into two non-parallel light beams which are angled relative to each other so that they will intersect at a desired angle on or in a moving object;

receiving light reflected from the moving object with an optical receiver;

determining the spectral maximum of the intensity modulation of the reflected light and the speed of the moving object;

periodically taking images from the surface of the object with a position sensitive detector;

storing the images, and determining the direction of movement of the object by correlation of the individual stored images.

2. The method for measuring the speed of a moving object of claim 1, including the steps of:

measuring the temperature of the laser;

inputting the measured temperature to the processor;

correcting the measured speed based on the temperature of the laser and the wavelength of the laser beam.

3. The method for measuring the speed of a moving object of claims 2, wherein the measured speed correction is based on a correction table which is stored in the processor which indicates the relationship between the wavelength of the laser beam and its laser's temperature.

4. The method for measuring the speed of a moving object of claim 2, wherein the measured speed correction is based on an equation which is stored in the processor which indicates the relationship between the wavelength of the laser beam and its laser's temperature.

5. A method for correcting a measured speed of a moving object comprising the steps of:

generating a coherent light beam;

splitting the coherent light beam with a Köster prism beam splitter which splits the light beam into two non-parallel light beams which are angled relative to each other so that they will intersect at a desired angle on or in a moving objects;

receiving light reflected from the moving object with an optical receiver; which provides a signal to a processor;

determining the spectral maximum of the intensity modulation of the reflected light and the speed of the moving object;

measuring the temperature of a generator of the light beam;

inputting the measured temperature to the processor; and correcting the measured speed based on the temperature of a generator of the light beam and the wavelength of the light beam.

6. The method for correcting a measured speed of a moving object of claim 5, wherein the measured speed correction is based on a correction table which is stored in the processor which indicates the relationship between the wavelength of the light beam and its generator's temperature.

7. The method for correcting a measured speed of a moving object of claim 5, wherein the measured speed correction is based on an equation which is stored in the processor which indicates the relationship between the wavelength of the light beam and its generator's temperature.

8. Apparatus for measuring the speed of a moving object, comprising:

a laser for generating a coherent light beam;

a Köster prism beam splitter which splits the light beam into two non-parallel light beams which are angled relative to each other so that they will intersect at a desired angle on or in a moving object;

an optical receiver for receiving reflected light from the moving object;

a processor which receives an output signal from the optical receiver and which determines the spectral maximum of the intensity modulation of the reflected light and the speed of the moving object;

a position sensitive detector for periodically taking images from the surface of the object;

means for storing the images, and means for correlating the stored images for determining the direction of movement of the object.

9. The apparatus of claim 8, further including:

means for measuring the temperature of the laser, the means for measuring the temperature being connected to the processor for inputting the measured temperature to the processor, and program means stored in the processor for correcting the measured speed based on the temperature of the laser and the wavelength of the laser beam.

10. The apparatus of claim 9, wherein the measured speed correction is based on a correction table which is stored in the processor which indicates the relationship between the wavelength of the laser beam and its laser's temperature.

11. The apparatus of claim 9, wherein the measured speed correction is based on an equation which is stored in the processor which indicates the relationship between the wavelength of the laser beam and its laser's temperature.

\* \* \* \* \*

UNITED STATES PATENT AND TRADEMARK OFFICE
CERTIFICATE OF CORRECTION

PATENT : 6,064,472
DATED : May 16, 2000
INVENTOR(S) : Peter Drewling

It is certified that error appears in the above-identified patent and that said Letters Patent is hereby corrected as shown below:

Column 5, last line, "objects" should read as -- object --.

Signed and Sealed this

Twentieth Day of March, 2001

Attest:

NICHOLAS P. GODICI

Attesting Officer

Acting Director of the United States Patent and Trademark Office